Oct. 7, 1958  R. N. BYLER ET AL  2,854,807
LAWN MOWER BLADE ASSEMBLY
Filed May 24, 1956

INVENTORS.
Nathan R. Hendricks
Robert N. Byler
BY
Thos. E. Scofield
ATTORNEY.

United States Patent Office 2,854,807
Patented Oct. 7, 1958

2,854,807

LAWN MOWER BLADE ASSEMBLY

Robert N. Byler and Nathan R. Hendricks, Dallas City, Ill.; said Hendricks assignor to said Byler Application May 24, 1956, Serial No. 587,040

2 Claims. (Cl. 56—295)

This invention relates to blades for rotary lawn mowers and refers more particularly to a rotary lawn mower blade assembly which is rigidly mountable on the drive shaft of a rotary lawn mower, the blade assembly construction being such that the blade is deformable upon impact with a relatively heavy or immovable object.

Previously, conventional lawn mower blades have been extremely heavy and rigid in construction. Additionally, conventional lawn mower blades are usually mounted between rubber or fiber discs designed to permit the blade to slip therebetween if it should strike relatively heavy or immovable objects. Such blade construction and mountings have proved unable to avoid heavy damage to the drive shaft, engine, and often the mower housing itself when the massive rigid conventional blade strikes objects or the like of considerable mass especially at the high rates of revolution employed in the lawn mowers of today.

Another very serious objection to such conventional lawn mower blade construction and mountings is that the friction mountings permit oblong or egg-shaped wear of the central blade opening used to mount the blade on the drive shaft. Once such asymmetric wear of the blade opening has taken place, the blades cannot be balanced relative the drive shaft in rotation and set up a great deal of vibration which causes wear in the motor, noise, etc. This lack of balance is independent of whether or not the blades are balanced in the sharpening thereof as the uneven wear at the central opening in the blade causes shifting of the blade relative the drive shaft and unbalance automatically results.

Therefore, an object of the present invention is to provide a lawn mower blade assembly wherein the blade assembly is rigidly mounted on the drive shaft, the blade itself being of very light weight construction and resiliently deformable on impact with a relatively massive or immovable object.

Another object of the invention is to provide a lawn mower blade assembly wherein the lawn mower blade is rigidly mounted on the drive shaft, the blade itself being of light weight and resilient construction to be deformable on impact with relative massive or immovable objects, the blade, however, being strong enough due to its unique construction to easily withstand the ordinary stresses of grass cutting even in the heaviest type of grass and underbrush generally encountered by rotary lawn mowers.

Another object of the invention is to provide a lawn mower blade assembly with a rigidly mounted blade on the drive shaft, the blade itself being resiliently deformable and light weight and so constructed as to bend down on impact with a relatively massive or immovable object to engage the ground and stop the engine in a relatively resilient manner without transmitting a sudden jarring shock to the drive shaft or to the engine itself.

Another object of the invention is to provide a lawn mower blade assembly wherein the blade is rigidly mounted on the drive shaft yet the blade itself is exceedingly light weight and resiliently deformable, the lightness of the blade making it easier to stop with a minimum of strain and stress on the drive shaft and connected parts thereto.

Another object of the invention is to provide a lawn mower blade assembly with a lawn mower blade which is rigidly mounted on the drive shaft, the blade itself being resiliently deformable and of light weight and also easily replaceable in the blade mounting in the manner of a razor blade in a razor.

Another object of the invention is to provide a lawn mower blade assembly wherein the lawn mower blade is rigidly mounted on the drive shaft, said rigid mounting permitting accurate balancing of the blade itself since oblong wear of the central opening in the blade for mounting it on the drive shaft is eliminated, thereby also eliminating the vibration problem common to conventional lawn mower blades.

Another object of the invention is to provide a lawn mower blade assembly wherein the lown mower blade is rigidly mounted on the drive shaft, the type of rigid mounting employed predefining the deformation area of the blade should it strike a relatively immovable or massive object.

Yet another object of the invention is to provide a lawn mower blade assembly wherein the blade is rigidly mounted on the drive shaft, the blade itself being of very light construction and resiliently deformable on impact with relatively heavy or immovable objects, the blade additionally being formable with ends depressed to provide a blowout action for the cut grass, while yet retaining all of the advantages of the deformable construction.

Other and further objects of the invention will appear in the course of the following description thereof.

In the drawings, which form a part of the instant invention and are to be read in conjunction therewith, an embodiment of the invention is shown and, in the various views, like numerals are employed to indicate like parts.

Figure 1:
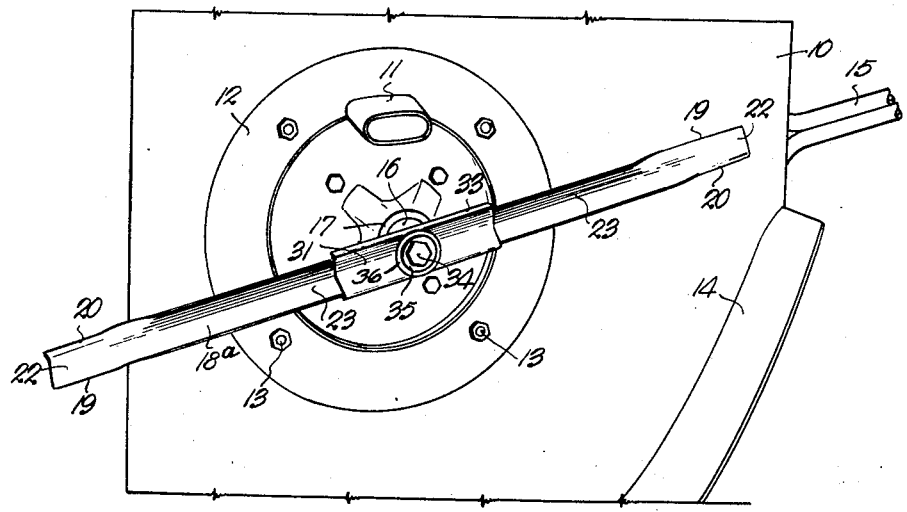
Fig. 1 is a partial view of the underside of a conventional lawn mower, the inventive lawn mower blade assembly being shown mounted on the drive shaft of the rotary power source.
Figure 2:
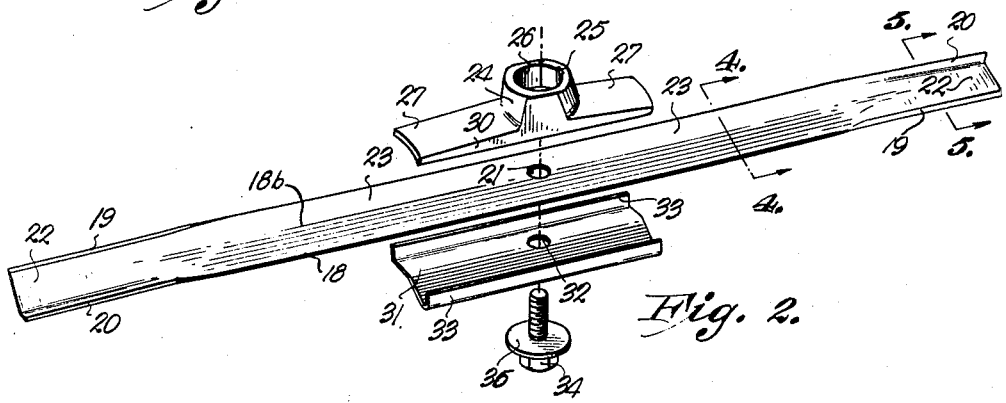
Fig. 2 is a view in exploded form showing the various parts of the inventive lawn mower blade assembly before assembly thereof and positioning on the drive shaft of a rotary mower.
Figure 3:
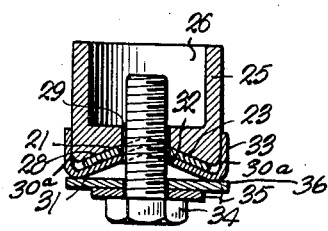
Fig. 3 is a side sectional view through the center of the assembled inventive lawn mower blade assembly of Fig. 2.
Figure 4:
Fig. 4 is a view taken along the lines 4—4 of Fig. 2 in the direction of the arrows.
Figure 5:
Fig. 5 is a view taken along the lines 5—5 of Fig. 2 in the direction of the arrows.

Referring to the drawings, in Fig. 1 is shown the inventive lawn mower blade assembly mounted on the underside of a conventional lawn mower, only a part of which is shown. Top plate 10 carries power source or motor (not shown) having exhaust 11 extending through plate 10. The motor is fixed to circular plate 12 by bolts 13.

Depending skirt 14 extends downwardly from the top plate 10 and encloses most of the blade rotation area. Handle 15 is attached to the top plate 10, only one of the arms of the handle being shown. Drive plate 16 is attached to the motor and extends through the bearing 17 centrally of the top plate 10. The component parts of the inventive lawn mower blade assembly will now be described relative Figs. 2–5 before the assembly on the mower is set forth relative Fig. 1.

The blade 18 itself is of relatively light construction and readily deformable upon striking a relatively immovable or massive obstruction. As a specific example of such light blade construction, a 16 gauge 1045 grade carbon steel strip one inch wide is readily employable for a blade 20 inches in diameter. Sharpened portions 19 are positioned on opposite sides of blade 18 and at opposite ends thereof. Opposite the sharpened portions 19 are conventional upwardly angled portions 20 for creating an upward flow of air within the lawn mower housing. Said upwardly angled portions 20 are on opposite sides of the blade 18 and the opposite ends thereof. Central opening 21 is formed in the blade for mounting thereof on the drive shaft 16. The outer ends of the blade 22 are preferably slightly downwardly angled to create an outward flow of air to move cut grass outwardly in the housing thereby avoiding pile up of the grass above the blade in the housing. Blade 18 is angled in cross section as shown at 23 on both sides of the central opening 21. The cross-sectional angling produces a concave surface 18a on the underside of the blade 18 adjacent opening 21 and corresponding convex surface 18b on the upper side thereof. Such angling of the blade adds strength and rigidity to the relatively light blade in the normal operation of grass cutting and also predisposes the blade to downward deformation upon striking an obstruction. Such angled portion of the blade preferably extends past the inner end of the sharpened portions 19 and into the downwardly angled portions 22 for strength in said areas. The angling of the blade is preferably symmetrical for balance.

The means for rigidly mounting the blade 18 on the drive shaft 16 comprise a top piece with a drive shaft engaging portion 24 thereof having a slot 25 in the drive shaft receiving opening or orifice 26 therein to permit keying of the top piece to the drive shaft in a rigid manner. Arms 27 extend outwardly away from the central opening 26 to overlie the blade 18 on both sides of the central opening 21 therein. The top piece has a concave underside 28 to fit the convex portion of the blade 18 and contact it along essentially the entire length of the top piece. Bolt opening 29 extends through the lower portion of the top piece into opening 26. The width of the top piece is preferably essentially equal to the width of the blade and the edges 30 thereof adjacent the edges of the blade 18 are in line therewith. The bottom piece of the blade mounting means comprises a channel 31 which is angled in cross section to match the grooving or angling of the blade in cross section. The width of the bottom piece channel is preferably slightly greater than that of the blade and at least equal to that of the top piece. The bottom piece has a central hole 32 therein matching the central opening 21 in the blade and opening 29 in the top piece. Upwardly extending edges 33 of the bottom piece are of such length as to extend past the edges of the blade and the lower edges 30a of the top piece to lock the blade firmly between the top and the bottom pieces.

The means for joining the blade assembly together and mounting it on the drive shaft 16 comprises bolt 34 and washers 35 and 36. Bolt 34 is of sufficient length to extend through the washers 35 and 36, bottom piece channel 31, and the top piece bolt opening 29 to extend upwardly within the top piece drive shaft orifice or opening 26 whereby to engage and thread into a threaded opening (not shown) in the end of the drive shaft. When the bolt 35 is threaded into the opening in the end of the drive shaft and the key slot 25 is fitted over a key on the end of the drive shaft the blade 18 is rigidly mounted on the end of said drive shaft and will not slip relative thereto upon striking any object.

In operation, with the blade 18 rigidly mounted on the drive shaft 16 as shown in Fig. 1, the blade will rotate until it strikes a relatively massive or immovable object. Since the blade is angled in cross section and the central portion of the blade is gripped between the top and bottom pieces, the blade will readily bend downwardly between the point of impact and the end of the top and bottom pieces adjacent the point of impact. As the blade is deformed downwardly and backwardly, the velocity thereof is reduced in a relatively smooth and resilient fashion compared to the sudden shocking stop encountered with conventional blades. If the resistance encountered by the blade is sufficient, it will bend downwardly until it contacts the ground and digs thereinto and thus will come to a stop.

To replace the blade, the bolt 34 is merely unthreaded from the drive shaft, the lower piece removed, the old blade removed and a new blade inserted between the top and bottom pieces. If no damage to the original blade results from striking any heavy or immovable object, the blade may easily be removed, as described, for sharpening and balancing and replaced between the top and bottom pieces. Since the blade is rigidly gripped between the top and bottom pieces and held by bolt 34 relative thereto, there can be no oblong or asymmetric wear of the central opening 21 in the blade. Therefore, if the blade is balanced in the sharpening operation the blade will be balanced when returned to the drive shaft and put back into use. Thus it is seen that the blade may be removed if deformed or if sharpening is needed and a new blade or the old blade after sharpening replaced easily in the assembly as if replacing a razor blade in a conventional razor.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter hereinbefore set forth or shown in the accompanying drawings is to be interpreted as illustrative and not in a limiting sense.

Having thus described our invention, we claim:

1. In a lawn mower blade and blade mounting assembly for use in rotary lawn mowers employing an elongate, substantially horizontal rotatable blade having sharpened portions on opposite sides of the blade and on opposite ends thereof mounted on a substantially vertical drive shaft, the blade having a central opening therein for mounting thereof on the lawn mower drive shaft, the improvement which comprises the blade of relatively light construction whereby to deform readily upon striking a relatively massive obstruction at the operating speeds of the mower, the blade angled in cross section on both sides of the central opening to increase the rigidity thereof so as not to flutter in operating rotation at said operating speed, rigid mounting means for the blade comprising a top piece at least substantially conforming to and fitting the convex surface of the blade, a bottom piece at least substantially conforming to and fitting the concave surface of the blade, and means engaging said two pieces and blade to fix them to the drive shaft and relative one another whereby neither the blade nor the mounting means will slip relative one another or the drive shaft when the blade strikes a relatively massive obstruction.

2. A mounting assembly as in claim 1 wherein the bottom piece has upwardly extending flanged edges past the lower edge of the top piece.

References Cited in the file of this patent

UNITED STATES PATENTS

| | | |
|---|---|---|
| 983,639 | Ocumpaugh | Feb. 7, 1911 |
| 1,794,178 | Karcher | Feb. 24, 1931 |
| 2,081,807 | Gabriel | May 25, 1937 |
| 2,643,502 | Flanigan | June 30, 1953 |
| 2,651,159 | Rountree | Sept. 8, 1953 |
| 2,685,160 | Kuhary et al. | Aug. 3, 1954 |
| 2,760,327 | Bovee | Aug. 28, 1956 |
| 2,786,318 | Caldwell et al. | Mar. 26, 1957 |
| 2,795,916 | Miller | June 18, 1957 |
| 2,799,985 | Rosenberg | July 23, 1957 |